(12) United States Patent
Denny

(10) Patent No.: US 9,737,169 B2
(45) Date of Patent: Aug. 22, 2017

(54) UNIVERSAL LID

(71) Applicant: Wayne Howard Denny, Reno, NV (US)

(72) Inventor: Wayne Howard Denny, Reno, NV (US)

(*) Notice: Subject to any disclaimer, the term of this patent is extended or adjusted under 35 U.S.C. 154(b) by 0 days.

(21) Appl. No.: 14/464,930

(22) Filed: Aug. 21, 2014

(65) Prior Publication Data

US 2015/0024104 A1 Jan. 22, 2015

Related U.S. Application Data

(63) Continuation of application No. PCT/US2013/051032, filed on Jul. 18, 2013.

(51) Int. Cl.
| | | |
|---|---|---|
| *B65D 51/00* | (2006.01) | |
| *A47J 36/06* | (2006.01) | |
| *A47J 27/00* | (2006.01) | |
| *A47J 36/00* | (2006.01) | |

(52) U.S. Cl.
CPC ............... *A47J 36/06* (2013.01); *A47J 27/00* (2013.01); *A47J 36/00* (2013.01); *Y10S 220/912* (2013.01)

(58) Field of Classification Search
CPC . A47J 36/06; A47J 27/00; A47J 36/00; B65D 51/16
USPC ...... 220/212.5, 367.1, 573.1, 287, 373, 369, 220/912; 426/523; 126/373.1
See application file for complete search history.

(56) References Cited

U.S. PATENT DOCUMENTS

| | | | | |
|---|---|---|---|---|
| 4,482,077 A | * | 11/1984 | Henderson | A47J 36/06 126/299 C |
| 4,828,140 A | * | 5/1989 | Henderson | A47J 37/101 220/287 |
| 5,613,618 A | * | 3/1997 | Raoult | A47J 36/08 220/287 |
| 2012/0080430 A1 | * | 4/2012 | Hoff | A47J 36/38 220/212 |

* cited by examiner

*Primary Examiner* — Fenn Mathew
*Assistant Examiner* — Elizabeth Volz
(74) *Attorney, Agent, or Firm* — Mark A. Goodman, Esq.

(57) ABSTRACT

A universal cooking/container lid for providing ventilation includes a semi-spherical base member having a circular outer-rim and an apex. The semi-spherical base member has a stand on an exterior surface and a handle on an interior surface thereof surrounding the apex. The semi-spherical base member has one or more venting perforations. A portion of the exterior surface between the stand and the outer rim may be tapered thereby providing a ventilation channel. A top portion of the handle is configured to fit snugly into a bottom portion of the stand, thereby allowing multiple cooking/container lids to be easily stacked. A method of providing ventilation while cooking is also provided.

13 Claims, 5 Drawing Sheets

UNIVERSAL LID

TYPE OF APPLICATION

This is a U.S. Non-Provisional Utility application filed under the provisions of 35 USC §111(a). This Application is continuation prosecution application of pending PCT Application number "PCT/US 13/51032" having an international filing date of Jul. 18, 2013 having the same inventorship as the instant application. This applications is substantively identical to the earlier filed PCT application.

CLAIM TO PRIORITY OF EARLIER FILED APPLICATION

Claim is hereby made to priority of pending PCT Application number "PCT/US 13/51032" having an international filing date of Jul. 18, 2013. Priority is claimed under the provisions of 35 USC §120 and/or §119 and 37 CFR §1.53 and 35 USC §365. This application has identical inventorship to the application from which priority is claimed.

FIELD OF THE DISCLOSURE

The present disclosure relates generally to the field of lids. More particularly, the present disclosure relates to a universal cooking lid and a universal container lid.

BACKGROUND

Cooking lids are commonly used to cover cooking vessels such as pots, pans and other kinds of containers while preparing food or boiling water. A disadvantage of conventional cooking lids is that a typical conventional cooking lid only lid only fits a pot/pan of a particular size. Therefore, the user might have to dig through his/her cooking drawers in order to find the right lid for the desired pot/pan to be used. A typical conventional cooking lid has a semi-spherical base member with a handle on the exterior surface. The outer rim of a typical cooking lid contacts the outer rim of the cookware. This is why a typical cooking lid is inoperable if the lid is not particularly sized to fit the piece of cookware being used.

By contrast, the present invention provides a cooking lid with the handle on the interior surface of the semi-spherical base member. This allows the cooking lid to contact the outer rim of a piece of cookware at many different positions. This allows the cooking lid of the present invention to fit a whole range of cookware sizes. It is estimated that 3 different cooking lids according to the present invention could cover nearly all sizes of cookware on the market.

Cooking lids with vent holes or ventilation systems have been used for efficient and proper cooking or reheating of food. These cooking lids are typically designed with vent holes to allow the steam to escape from the cooking vessel and, thereby, reduce the amount of pressure in the cooking vessel that results in boiling over/lid rattling issues and also provides a uniform distribution of the heat inside the pot. In these kinds of systems, cooking causing lids to release vapor from the container or cooking vessel under pressure. Such lids can cause the loss of nutritive properties from the foods and the splattering of food particles.

Various types of cooking lids have been devised. One of the existing cooking lids describes a splatter-proof lid capable of two settings, one in which vent passages are provided to allow fumes from under the lid to pass to the exterior and another in which the vent passages are closed. This splatter-proof lid having a central knob and two lid portions. However, the lid portions have to be separated for providing vent passages for cooking fumes or vapors to escape from a pan or pot. In addition, the lid cannot be placed in a displaced position on the cooking vessel brim to allow the vapor to escape between rim and side walls.

Some conventional cooking lids include an adjustable ventilation system that uses the combination of various sized holes to modify and regulate the release of steam and provide the retention of moisture within the cooking vessel. However, the adjustable ventilation system is releasably secured to the cooking vessel and so the user often finds it difficult to attach and remove the adjustable ventilation system from the cooking vessel.

Another existing cooking lid describes a body portion having a rim, an underside, and a handle, wherein the rim has a support surface and an outer surface, and is matched to a brim on the cooking vessel brim in size and shape. The lid is configured to be placed in a closed position on the cooking vessel brim and is configured to be placed in a displaced position on a plane of the cooking vessel brim. However, the lid includes additional pair of lugs to keep the lid is in the displaced position on the cooking vessel brim.

Some other traditional cooking lids can be placed on top of each other, with the largest lid uppermost and the smallest lid lowermost. The disadvantage of this approach is increased production costs associated with multiple lid diameters. Also, these lids are only matches with the pots/pans having similar diameter. Thus the size of the cooking lid is restricted by the size of the pots/pans. This approach can also lack sufficient stability for stacking different sized cooking lids. Attempts have been made to compensate for this instability with a lid having a handle which is configured to engage the underside of another such or similar lid so that the latter can be supported on the handle in a substantially stable condition. However, this approach sometimes causes the slipping of the lid from the other lid, and also greatly restricts the number of cooking lids to be stacked.

Therefore, there is a need for an improved cooking lid that provides ventilation for efficient and proper cooking or reheating of food. As such, the cooking lid includes a tapered surface that provides a ventilation channel. The needed cooking lid includes one or more venting perforations to provide efficient ventilation. The needed cooking lid includes a handle which is configured to fit snugly with one or more protrusions on a stand on the underside of another cooking lid, thereby allowing multiple cooking lids to be easily and tightly stacked. Finally, the cooking lid could be placed off-center relative to center of the cooking vessel in a displaced position due to the tapered structure of the cooking lid without causing the release of the cooking lid from the cooking vessel.

Conventional container lids face many of the same challenges as described above for cooking lids. Usually only there is only one configuration of lid that "fits" a particular container. Once again, this means that "fitting" container lid must be located and matched with the right container. Therefore, there is a current need for a universal container lid that fits containers with an entire range of diameters.

SUMMARY OF THE INVENTION

Advantages of One or More Embodiments of the Present Disclosure

The various embodiments of the present invention may, but do not necessarily, achieve one or more of the following advantages:

The ability to provide a cooking lid that fits easily onto an entire range of cooking vessels.

The ability to provide a container lid for that fits easily onto an entire range of cylindrical containers.

The ability to allow the user to easily stack the cooking lids one on top of the other.

The ability to provide a cooking lid with one or more venting perforations.

The ability to use a cooking lid that functions as a splatter guard.

The ability to use a cooking lid that functions as a colander.

The ability to provide a cooking lid that may be placed in a displaced position to allow ventilation when desired.

The ability to allow a simple, convenient and ease of use to the user.

These and other advantages may be realized by reference to the remaining portions of the specification, claims, and abstract.

BRIEF DESCRIPTION OF THE PREFERRED EMBODIMENTS OF THE PRESENT DISCLOSURE

In a preferred embodiment, the present invention comprises a cooking lid for covering a piece of cookware. The cooking lid includes a semi-spherical base member having a circular outer-rim and an apex. The semi-spherical base member has an interior and an exterior surface. A stand may be connected to the exterior surface of the semi-spherical base member surrounding the apex. A handle may be connected to the interior surface of the semi-spherical base member surrounding the apex. Optionally, the semi-spherical base member has one or more venting perforations. A portion of the exterior surface of the semi-spherical base member between the stand and the outer rim may be tapered thereby providing a ventilation channel. A top portion of the handle may be configured to fit snugly into a bottom portion of the stand, thereby allowing multiple cooking lids to be easily stacked. There may be three or more protrusions located on a circular radius about the apex. The protrusions have a flat bottom portion and preferably are made of a non-conductive material. The cooking lid may be placed on a cookware such that the apex of the semi-spherical base member rests above a center of the piece of cookware thereby trapping vapor for cooking. The cooking lid may be repositioned in a displaced position to allow vapor to escape when ventilation is desired.

A second preferred embodiment comprises a container lid for cylindrical containers including a semi-spherical base member, the semi-spherical base member having a circular outer-rim and an apex, thereby defining an interior and an exterior surface of the semi-spherical base member; a stand connected to the exterior surface of the semi-spherical base member, wherein the stand surrounds the apex; a handle connected to the interior surface of the semi-spherical base member wherein the handle surrounds the apex. The container lid may be used for paint containers, food storage containers and the like.

A third preferred embodiment comprises A method of achieving ventilation while cooking comprising: providing a cooking lid, the cooking lid comprising: a semi-spherical base member, the semi-spherical base member having a circular outer-rim and an apex, thereby defining an interior and an exterior surface of the semi-spherical base member; a stand connected to the exterior surface of the semi-spherical base member, wherein the stand surrounds the apex; a handle connected to the interior surface of the semi-spherical base member wherein the handle surrounds the apex; placing the cooking lid on a piece of cookware, the cookware having a hollow cylindrical shape with an open top, wherein the cooking lid is placed such that the apex of the semi-spherical base member rests above a center of the piece of cookware thereby trapping vapor; repositioning the cooking lid such that the apex of the semi-spherical base member rest off-center relative to the center of the piece of cookware thereby allowing vapor to escape between the outer-rim of the semi-spherical base member and a side wall of the cookware when ventilation is desired.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF CERTAIN EMBODIMENTS OF THE PRESENT DISCLOSURE

Figure 1:
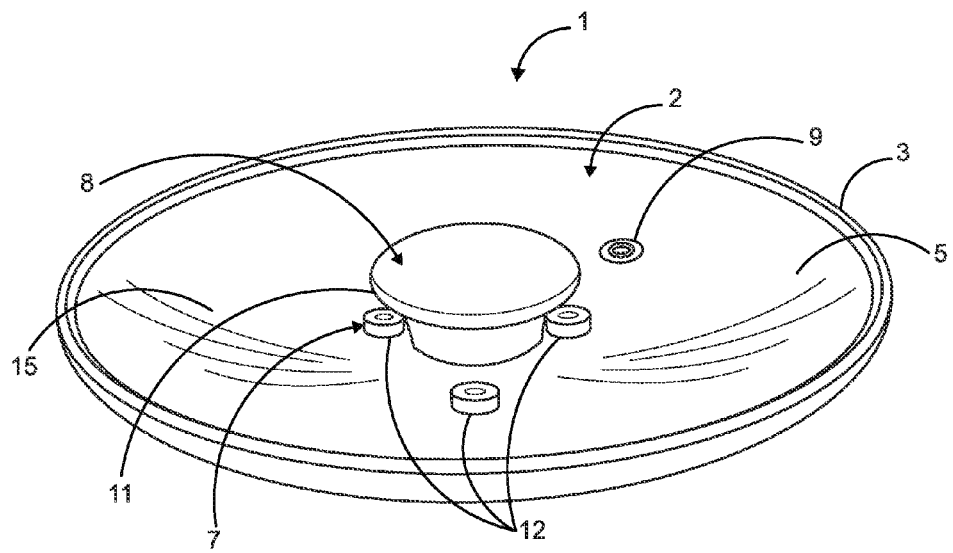
FIG. 1 is substantially a top perspective view of the preferred embodiment of the present invention.
Figure 2:
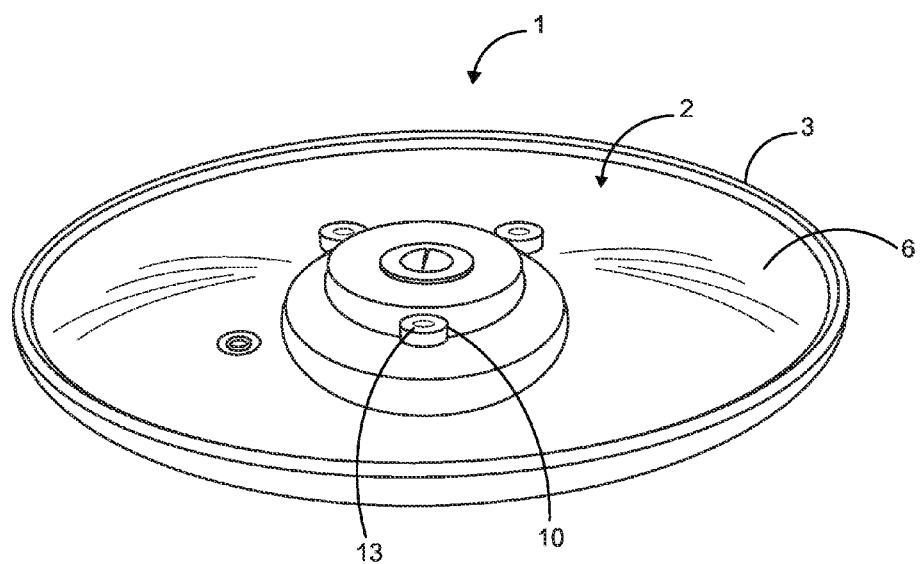
FIG. 2 is substantially a bottom perspective view of the preferred embodiment of the present invention.
Figure 3:
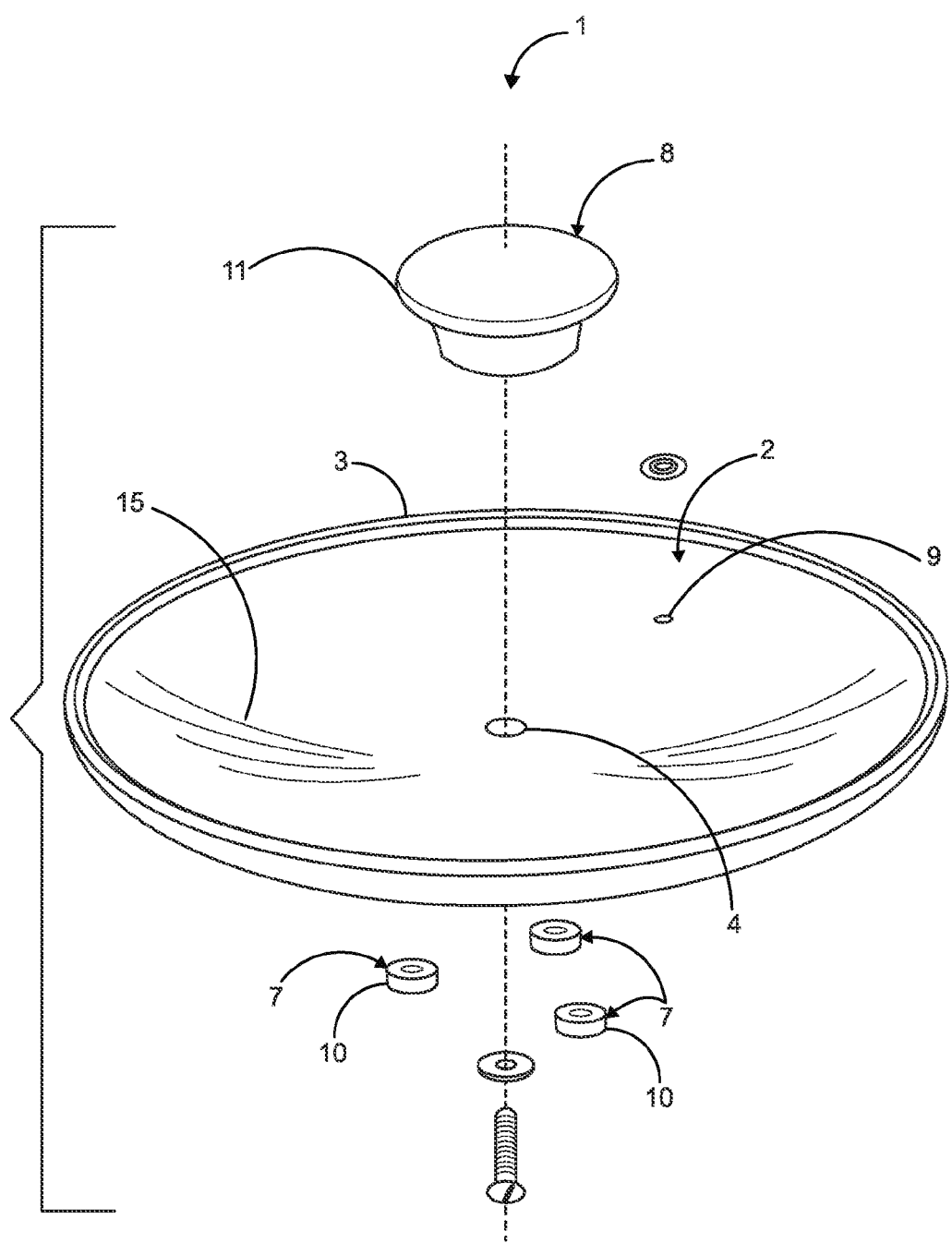
FIG. 3 is substantially an exploded view of the preferred embodiment of the present invention.
Figure 4:
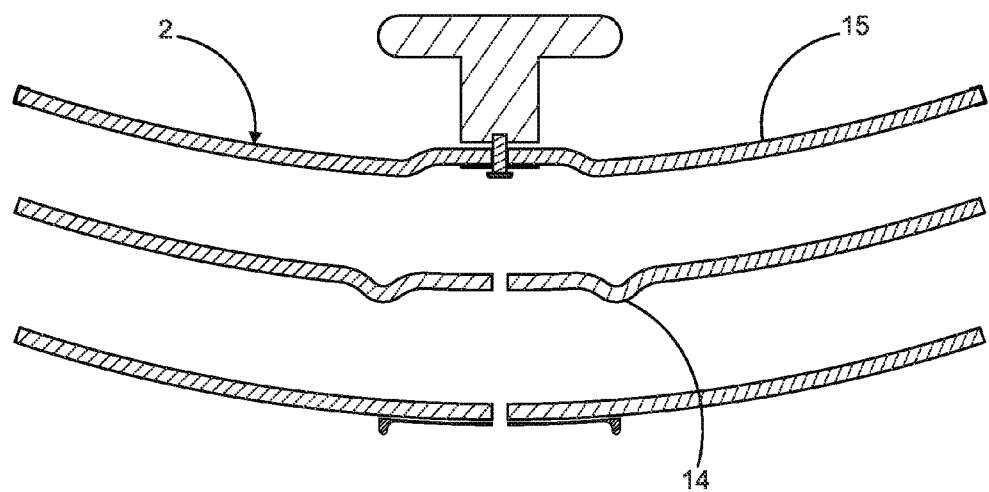
FIG. 4 is substantially an exploded cross sectional view of the preferred embodiment of the present invention.
Figure 5:
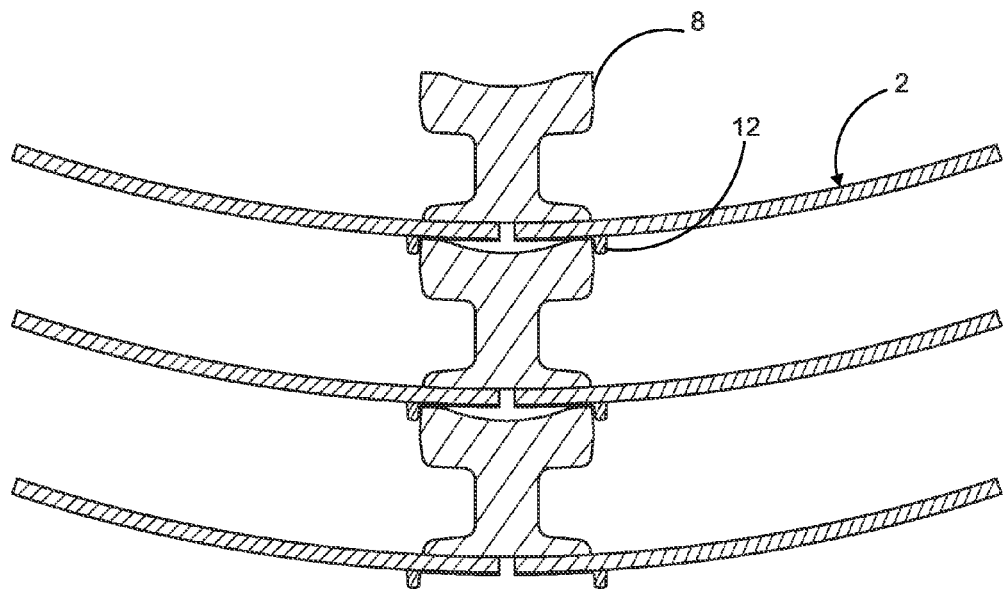
FIG. 5 is substantially a cross sectional view of the preferred embodiment of the present invention stacked on top of one another.
Figure 6:
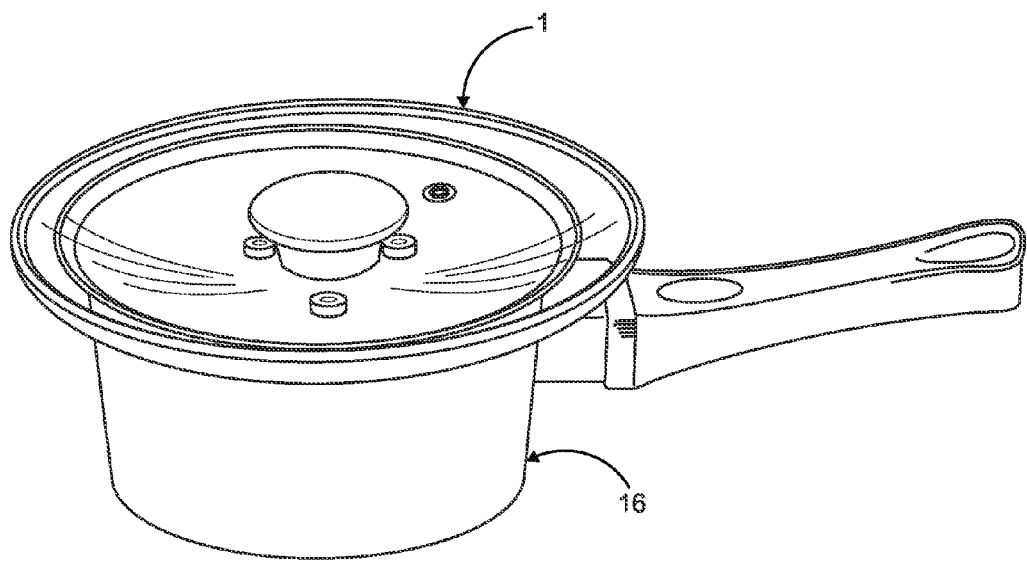
FIG. 6 is substantially a detailed illustration of the preferred embodiment in use.
Figure 7A:
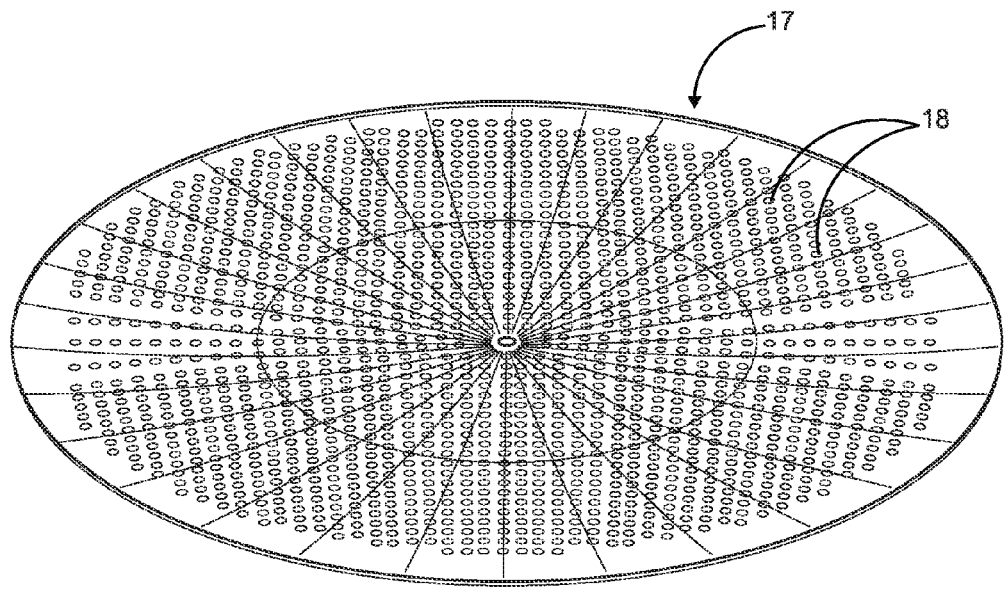
FIG. 7A is substantially a perspective view of a semi spherical base member of another embodiment of the present invention.
Figure 7B:
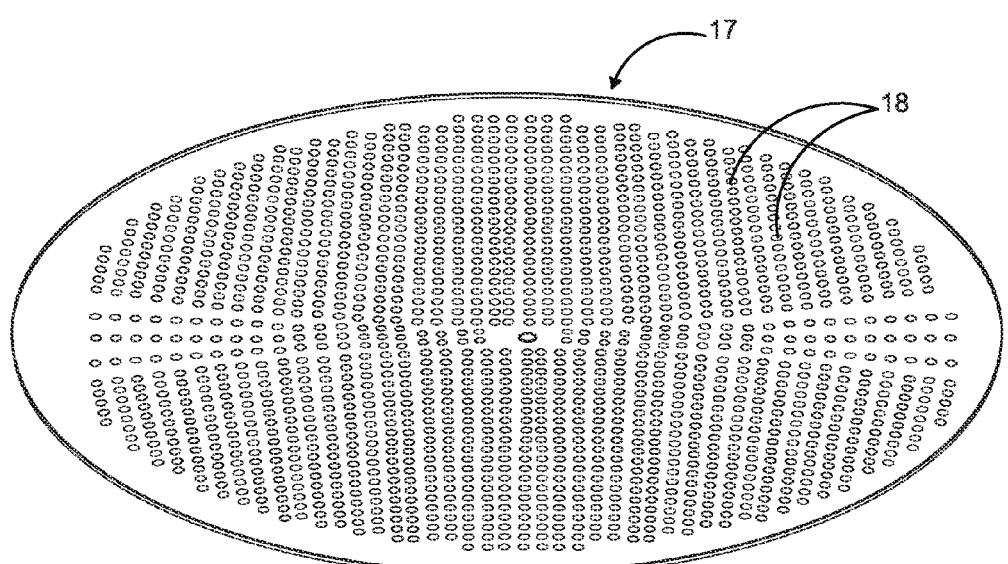
FIG. 7B is substantially a perspective view of a semi spherical base member of yet another embodiment of the present invention.

In the following detailed description of the preferred embodiment, reference is made to the accompanying drawings, which from a part of this application. The drawings show, by way of illustration, specific embodiments in which the invention may be practiced. It is to be understood that other embodiments may be utilized and structural changes may be made without departing from the scope of the present invention.

The following is a listing of the reference numbers included in the original drawings and the element that each reference number corresponds to and a brief description:

1. Cooking or container lid. The cooking lid 1 includes a semi-spherical base member 2 in accordance with the preferred embodiment.
2. Semi-spherical base member. This includes a circular outer-rim 3 and an apex 4.
3. Circular outer-rim. This is the periphery of the semi-spherical base member 2.
4. Apex. This is the center of the semi-spherical base member 2.
5. Interior surface. This is the top surface of the semi-spherical base member 2.
6. Exterior surface. This is the bottom surface of the semi-spherical base member 2.
7. Stand. This is connected to the exterior surface 6 of the semi-spherical base member 2 surrounding the apex 4.
8. Handle. This is connected to the interior surface 5 of the semi-spherical base member 2 surrounding the apex 4.
9. Venting perforations. This is located on the semi-spherical base member 2.
10. A bottom portion of the stand. This is configured to easily stack the cooking lids 1 one on top of the other.
11. A top portion of the handle. This is configured to fit snugly with a bottom portion of the stand 10 to easily stack the cooking lids 1 one on top of the other.
12. Protrusions. This is included in the stand 7 located on a circular radius about the apex 4.
13. A flat portion. This is included in the protrusions 12.
14. A portion of the semi-spherical base member. This is an inverted portion that surrounds the apex 4 above the stand 7 and below the handle.
15. A portion of the exterior surface. This is located between the stand 7 and the circular outer rim 3.
16. Cookware. This is a cooking vessel e.g. pots, pans etc.
17. Semi-spherical base member of another embodiment. This includes a metal screen instead of glass.
18. Plurality of perforations of another embodiment. This is located on the semi-spherical base member 17.

The present invention comprises a cooking lid 1 for covering a piece cookware 16 such as a pot, pan, crockpot or the like. The cooking lid 1 includes a semi-spherical base member 2 having a circular outer-rim 3 and an apex 4. The circular outer-rim 3 and the apex 4 define an interior surface 5 and an exterior surface 6 of the semi-spherical base member 2. A stand 7 is connected to the exterior surface 6 of the semi-spherical base member 2 surrounding the apex 4. A handle 8 is connected to the interior surface 5 of the semi-spherical base member 2 surrounding the apex 4. The semi-spherical base member 2 has at least one venting perforation 9 to allow vapor to escape during cooking.

The stand 7 comprises a plurality of protrusions 12 located on a circular radius about the apex 4. The protrusions 12 have a flat bottom portion 13 and are composed of a non-conductive material. The semi-conductive material reduces the risk of a thermal shock to the cooking lid 1. The semi-conductive material is selected from the group consisting of silicon, stainless steel, and graphite. A top portion of the handle 11 is configured to fit snugly into a bottom portion of the stand 10, thereby allowing multiple cooking lids 1 to be easily stacked one on top of the other.

The semi-spherical base member 2 has a diameter selected from the group consisting of 33 centimeters, 27 centimeters, and 22 centimeters. A portion of the semi-spherical base member 14 that surrounds the apex 4 above the stand 7 and below the handle 8 is inverted. A portion of the exterior surface 15 of the semi-spherical base member 2 between the stand 7 and the circular outer rim 3 is tapered thereby providing a ventilation channel. The semi-spherical base member 2 can be made from different materials such as glass, plastic, metal, and tempered glass. The circular outer rim 3 can be made from different materials such as metal, plastic, stainless steel, and silicone.

As discussed in the background section, cooking lids are typically designed with vent holes to allow the steam to escape from the cooking vessel and, thereby, reduce the amount of moisture in the cooking vessel that results in boiling over or lid rattling issues and also provides a uniform distribution of the heat inside the pot. The preferred embodiment provides the simple cooking lid 1 that provides ventilation for efficient and proper cooking or reheating of food. The cooking lid 1 is adapted for use with different sizes of cooking vessels.

In use, the cooking lid 1 is placed on a piece of cookware 16 having a hollow cylindrical shape with an open top. The cooking lid 1 is placed such that the apex 4 of the semi-spherical base member 2 rests above a center of the piece of cookware 16 thereby trapping vapor inside the cookware 16. The cooking lid 1 is repositioned such that the apex 4 of the semi-spherical base member 2 rests off-center relative to the center of the piece of cookware 16 thereby allowing vapor to escape between the circular outer-rim 3 of the semi-spherical base member 2 and a side wall of the cookware 16 when ventilation is desired. The cookware 16 is selected from the group consisting of a pan, a pot, and a crock-pot.

In another embodiment, the semi-spherical base member 17 may be a metal screen instead of glass, which is a perforated metal for grease splatter or to drain the cookware 16. The semi-spherical base member 17 has a plurality of perforations 18. The plurality of perforations 18 allows a cooking lid to function as a splatter guard. A handle with an elongated shaft extending from the apex of the semi-spherical base member 17 which is connected to a knob member allows the cooking lid to function as a colander.

One of the main advantages of this cooking lid 1 is the tapering shape that provides a ventilation channel thereby providing ventilation for efficient and proper cooking or reheating of food. Another advantage of the present invention is that the handle 8 is configured to fit snugly with the one or more protrusions 12 on the stand 7, thereby allowing multiple cooking lids 1 to be easily and tightly stacked.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A cooking lid comprising:
   a. a semi-spherical base member, the semi-spherical base member having a circular outer-rim and an apex, thereby defining an interior and an exterior surface of the semi-spherical base member;
   b. a stand connected to the exterior surface of the semi-spherical base member, wherein the stand surrounds the apex;
   c. a handle connected to the interior surface of the semi-spherical base member wherein the handle surrounds the apex, the handle having a circular top portion;
   d. wherein the stand comprises: a plurality of circular protrusions disposed on a circular radius about the apex, the circular protrusions each extend perpendicularly away from the exterior surface of the semi-spherical base member, the circular protrusions each have a flat bottom portion thereby allowing the cooking lid to rest on the stand without tipping;

e. wherein the circular top portion is sized to fit snugly inside the circular radius thereby allowing multiple cooking lids to be easily stacked.

2. The cooking lid of claim 1, wherein the semi-spherical base member is made of glass and the outer-rim is made of metal.

3. The cooking lid of claim 1, wherein the outer-rim is made of plastic.

4. The cooking lid of claim 1, wherein the outer rim is made of stainless steel.

5. The cooking lid of claim 1, wherein the outer rim is made of silicone.

6. The cooking lid of claim 1, wherein the stand is made of a semi conductive material selected from the group consisting of graphite and silicone thereby reducing the risk of a thermal shock to the cooking lid.

7. The cooking lid of claim 1, wherein a portion of the semi-spherical base member that surrounds the apex above the stand and below the handle is inverted.

8. The cooking lid of claim 1, wherein a portion of the exterior surface of the semi-spherical base member between the stand and the outer rim is tapered thereby providing a ventilation channel.

9. The cooking lid of claim 1, wherein the semi-spherical base member has a diameter selected from the group consisting of 33 centimeters, 27 centimeters, and 22 centimeters.

10. The cooking lid of claim 1, wherein the semi-spherical base member has a plurality of perforations, thereby allowing the lid to function as a splatter guard.

11. The cooking lid of claim 10, wherein the handle has an elongated shaft extending from the apex of the semi-spherical base member connected to a knob member, thereby allowing the cooking lid to function as a colander.

12. A storage container lid for a cylindrical container comprising:

a. a semi-spherical base member, the semi-spherical base member having a circular outer-rim and an apex, thereby defining an interior and an exterior surface of the semi-spherical base member;

b. a stand connected to the exterior surface of the semi-spherical base member, wherein the stand surrounds the apex;

c. a handle having a circular top portion, the handle being connected to the interior surface of the semi-spherical base member wherein the handle surrounds the apex;

d. wherein the stand comprises: a plurality of protrusions disposed on a circular radius about the apex, the circular protrusions each extend perpendicularly away from the exterior surface of the semi-spherical base member, the circular protrusions each have a flat bottom portion thereby allowing the cooking lid to rest on the stand without tipping;

e. wherein the circular top portion is sized to fit snugly inside the circular protrusion, thereby allowing multiple cooking lids to be easily stacked.

13. The container lid of claim 12, wherein the semi-spherical base member is made of a material selected from the group consisting of plastic, glass, and metal.

* * * * *